Dec. 12, 1967     C. H. SPARKS     3,357,432
ANASTOMOTIC COUPLING
Filed Feb. 9, 1965
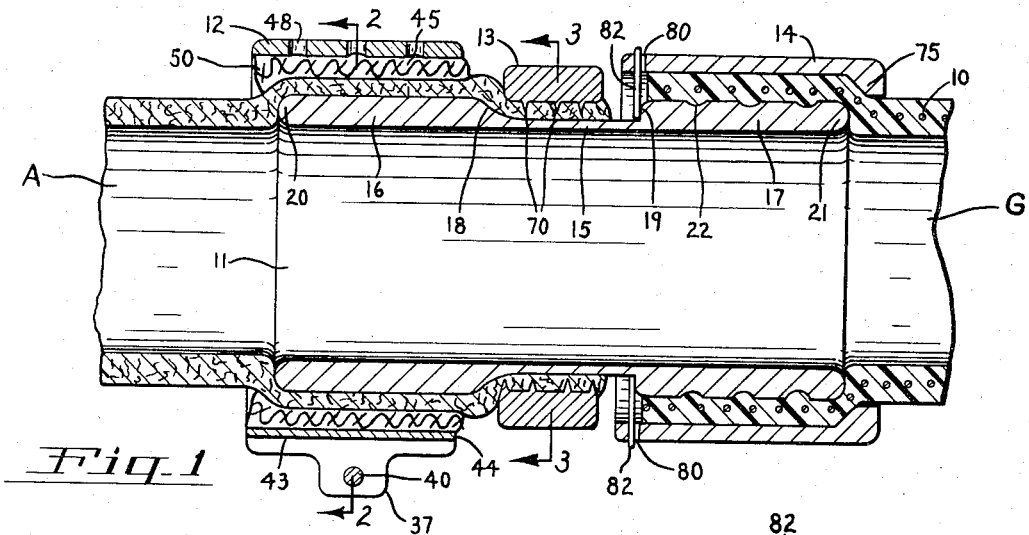
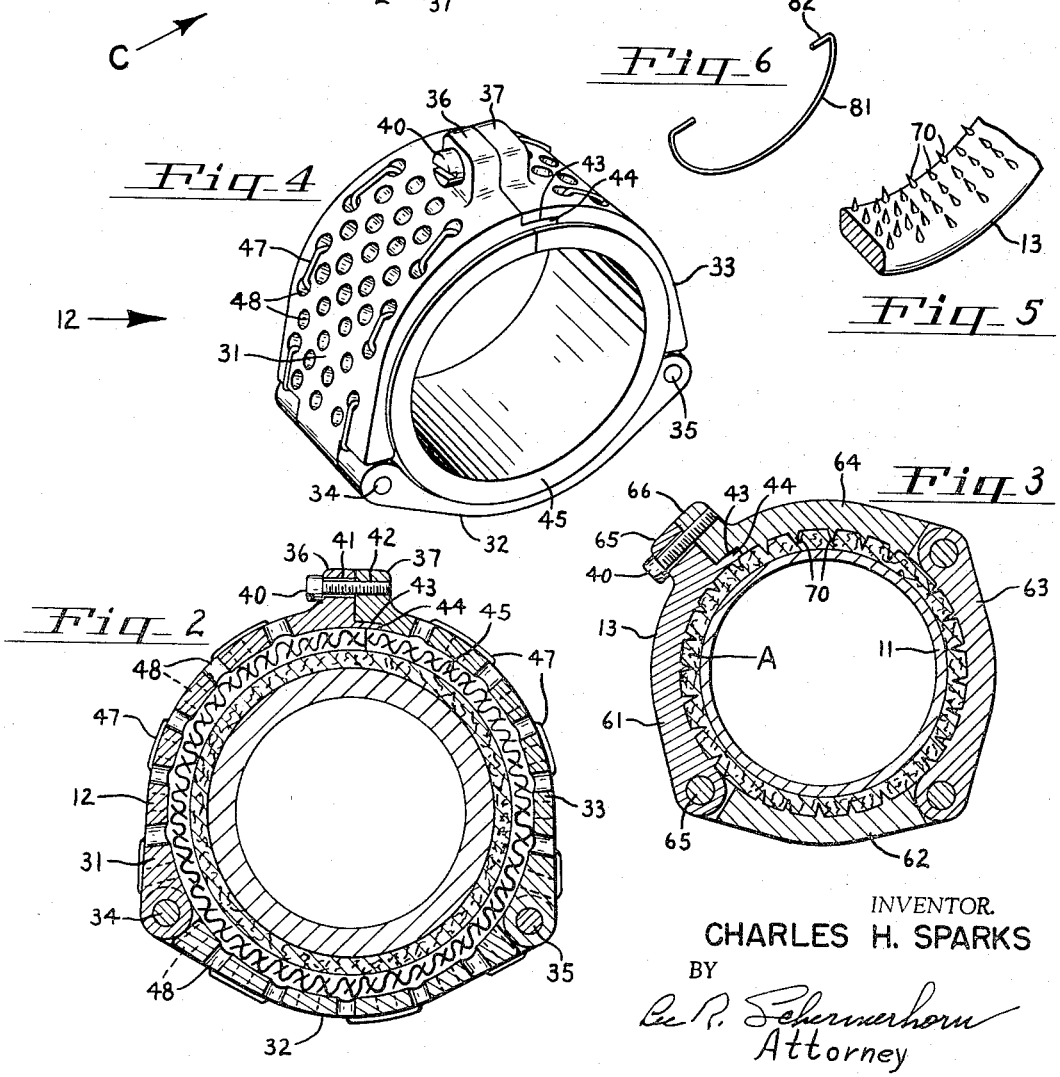
INVENTOR.
CHARLES H. SPARKS
BY
Lee R. Schermerhorn
Attorney

United States Patent Office 3,357,432
Patented Dec. 12, 1967

3,357,432
ANASTOMOTIC COUPLING
Charles H. Sparks, Portland, Oreg., assignor to Edwards Laboratories, Inc., Santa Ana, Calif., a corporation of California
Filed Feb. 9, 1965, Ser. No. 431,342
12 Claims. (Cl. 128—334)

ABSTRACT OF THE DISCLOSURE

A perforated and padded clamp ring for clamping one end of a natural body vessel on one end of a sleeve member, the pad overhanging the end of the sleeve to clamp the inner wall of the vessel axially against the end of the sleeve. The vessel is additionally secured by a toothed clamp applied behind an external shoulder on the sleeve. The opposite end of the sleeve is similarly connected to a natural body vessel or in a generally similar manner to a graft tube.

---

This invention relates to an anastomotic coupling and has particular reference to an arterial graft prosthesis.

Many difficulties and problems attend the implantation of a graft prosthesis as a substitute for a natural blood vessel. One of the foremost problems is to prevent blood clotting within the blood stream, which clots may later become free agents capable of occluding a major artery which would prevent blood flow to a vital organ. It has been found that any interior roughness, crevices or pockets tending to reduce the rate of flow of the blood even in small local areas promotes clotting in such regions. These quasi-stagnant regions of clot are susceptible to dislodgement of the clot which obviously can cause major, if not fatal, complications. It has been very difficult to design a connector entirely without such crevices where the velocity is materially retarded. This is particularly true in the arterial system where the vessels dilate and contract with each pulse beat. If the connector fitting or coupling includes rigid members, the walls of the vessels tend to pull away from such members during dilation to form objectionable crevices or pockets out of the path of the main stream of blood.

Other problems are created by the foreign body reaction of the blood to foreign substances and the difficulty of securing the ends of the vessels so that they will not pull apart under the pulse pressure or create such crevices or pockets as just mentioned. There is also the problem of providing a suitable material for the graft tube itself. The tendency has been to use a knitted, braided or woven fabric which is inherently rough and porous. According to the teachings of the present invention, it is believed that both roughness and porosity are objectionable.

Porosity can be overcome by special treatment of the material but the roughness inherent in a fabric is found to induce clotting on the inside and to promote the growth of a hard coating on the outside which quickly impairs the original flexibility of the graft tube. It is important that a high degree of flexibility be maintained especially across the main body joints, such as the hip joint and knee joint. Not only must the graft tube remain flexible indefinitely but it must not tend to flatten or kink and impede the free flow of blood when such body joints are sharply bent.

The general object of the present invention is, therefore, to provide an improved anastomotic coupling and improved graft tube which overcome the problems and difficulties pointed out above. Other objects are to provide a graft tube which is not rough or porous, which will remain flexible and which will not collapse in bending, to provide a sutureless coupling for the purpose described, to provide an improved coupling having means to prevent both the natural vessel and the graft tube from dilating in such a manner as to introduce crevices or pockets between them and the coupling which would promote clotting, to provide means for promoting the ingrowth of tissue to nourish the clamped portion of the natural vessel, to provide improved clamping means for both the natural vessel and the graft tube, to provide improved means to prevent the natural vessel and graft tube from pulling away from each other and to provide a coupling of the type described which may also be used to provide a branch connection. Another object is to provide materials for those parts which are directly exposed to the flow of blood which will resist the formation of a lining on the inside surfaces of the graft tube and coupling.

In the present prosthesis, the graft member comprises a tube of Silastic, plastic, or other suitable nonmetallic material such as silicone rubber which is smooth both inside and outside and is nonporous. To prevent collapsing or kinking, the tube is reinforced with a spiral metal wire or nonmetallic coiled or braided filament entirely contained within the wall of the tube.

The coupling comprises a sleeve of inert material having a smooth, polished inner surface and polished rounded surfaces at the ends of the cylinder. The severed end of the natural blood vessel is retained about one end of this sleeve by a circumferential artery antipulse ring which is lined with a porous Teflon felt pad or porous Silastic-cloth composite pad to promote ingrowth of tissue for nourishing the clamped portion of the vessel. The antipulse ring and pad are arranged to overhang the end of the sleeve and apply axial pressure against the wall of the vessel to prevent dilation of the natural blood vessel away from the end of the sleeve. Thus, the wall of the vessel is offset radially over the end of the sleeve and held to a fixed inside diameter which is the same as the inside diameter of the sleeve. This clamping ring is designated as an antipulse ring because of its function in preventing a natural artery from dilating away from the end of the sleeve with each pulse beat.

The natural vessel is secured against slipping off the end of the sleeve by a separate artery clamping ring equipped with fine teeth which penetrate into the natural vessel. The artery clamping ring is clamped behind an external shoulder on the sleeve so that it cannot shift lengthwise. The end of the graft tube is secured about the opposite end of the sleeve in a generally similar manner, means being provided to prevent dilation away from the end of the sleeve and to prevent longitudinal movement of the sleeve.

A graft prosthesis for arterial use is illustrated but features of the invention are also useful in the venous system and for anastomosing other naturally occurring tubes in the body including the esophagus, bile ducts and the ureters.

The foregoing and other objects and advantages will become apparent and the invention will be better understood with reference to the following detailed description of the preferred embodiment illustrated on the drawing. Various changes may be made in the details of construction and arrangement of parts and certain features may be employed without others. All such modifications within the scope of the appended claims are included in the invention.

In the drawing:

FIGURE 1 is an enlarged longitudinal sectional view showing an arterial graft prosthesis embodying the features of the invention;

FIGURE 2 is a cross sectional view taken on the line 2—2 in FIGURE 1;

FIGURE 3 is a cross sectional view taken on the line 3—3 in FIGURE 1;

FIGURE 4 is a perspective view of the antipulse ring in FIGURE 1;

FIGURE 5 is a fragmentary perspective view of the artery clamping ring in FIGURE 1; and FIGURE 6 is a perspective view of the tube clamping ring retainer shown in FIGURE 1.

In FIGURE 1 a section of a natural artery A has been removed and a graft tube G substituted. At each end of the graft tube a coupling C connects the graft tube with the severed end of the artery. FIGURE 1 shows one of these couplings, it being understood that the other end of the graft tube is connected with the other severed end of the artery or that of a different artery by an identical coupling reversed end for end.

The graft tube G is made of a suitable inert Silastic, plastic, or nonmetallic material such as silicone rubber which is substantially as flexible as the natural artery A. In order to prevent collapse of the rubber tube when the tube is bent sharply in body joints, the tube contains within its wall thickness a spiral or braided reinforcement of metal wire or nonmetallic filament 10. By way of example there is illustrated a spiral wire. Both inside and outside surfaces of the tube have as high a degree of smoothness as it is possible to attain.

The coupling C comprises an internal sleeve 11, an antipulse ring 12 and clamping ring 13 for the natural artery and a tube antipulse ring 14 and retainer for the graft tube. These parts are made from a suitable relatively inert and noncorrodible metal or nonmetallic material. A straight sleeve 11 is illustrated but it is to be understood that the sleeve may be made in the form of a Y, T or X for making branch connections for various purposes.

Sleeve 11 has a very smooth interior surface to prevent clot formation. A sleeve is selected having the same internal diameter at its left end as the normal internal diameter of the artery A, and the same internal diameter at its right end as graft tube 10. In the illustration all three members have a uniform internal diameter for smooth, constant velocity flow through the coupling. In a Y, T or X sleeve, the central portion may taper to form a reducer.

The wall of the sleeve has a center section 15 of reduced thickness between opposite end sections 16 and 17 of greater thickness to provide exterior shoulders 18 and 19 at the transition points. The opposite ends of the tube wall are rounded to form semicircular end surfaces at 20 and 21. The outer surface of thick section 17 may be provided with a plurality of circumferential grooves 22 or other recessed or projected shapes to enhance retention of the graft tube.

Antipulse ring 12 is made in three arcuate sections 31, 32 and 33 which are pivotally connected together by hinge pins 34 and 35, as shown in FIGURES 2 and 4. The ends of sections 31 and 33 are equipped with ears 36 and 37 for fastening the sections together. In the illustrated embodiment this fastener means comprises a screw 40 which passes through a smooth hole 41 in the ear 36 and has threaded engagement in a tapped hole 42 in the ear 37. Section 33 is recessed at 43 to accommodate the overlapping lip or flange 44 on section 31, forming an offset joint.

When the ears 36 and 37 are thus connected together, the three sections 31, 32 and 33 present a cylindrical interior surface. This interior surface is lined with a Teflon felt pad 45 of uniform thickness. The pad is made in one piece with a joint at 46 which is offset a short distance from the end of lip 44. The pad has a little excess length in a circumferential direction causing the felt to be somewhat compressed at the joint 46 when the ring is closed. The pad is secured to the three sections 31, 32 and 33 by sutures 47 through certain of the openings 48. Each section 31, 32 and 33 is provided with a multiplicity of the openings 48 extending over the length and width of the section, as shown, for a purpose which will presently be explained.

In applying the coupling to the end of the artery A, the sleeve 11 is forced into the end of the artery for a distance sufficient to cause the artery to extend over the thick portion 16 of the sleeve and a distance along the reduced portion 15 to accommodate the width of holding ring 13 as shown in FIGURE 1. In practice, the holding ring 13 is placed before the antipulse ring 12 is attached. Then the antipulse ring 12 is applied over the thick end portion 16 of the sleeve with one side of the ring overhanging the end 20 of the sleeve as shown. The dimensions of the antipulse ring are such that when the ears 36 and 37 are clamped tightly together by the screw 40, both the felt pad 45 and the wall of the artery A are compressed to approximately half their original thicknesses.

This placement of the antipulse ring allows an edge portion 50 of the felt pad 45 to overhang the end 20 of the sleeve and apply axial pressure to hold the inner surface of the artery wall firmly against the rounded end surface 20 without any gap or crevice, as shown in FIGURE 1. The internal diameter of the artery adjacent the end of the sleeve is maintained constant and prevented from expanding. When the artery tends to dilate with the pulsations of the heart beat, the inner surface of the artery wall cannot pull away from the sleeve end to create a crevice or pocket out of the main stream of the blood flow which would tend to promote clotting at such point. This is an especially important feature in an arterial connection and it is also important in connection with veins and other vessels where there is no arterial pulse.

The felt pad 45 being porous permits the ingrowth of tissue from the outer surface of the artery. Body fluids flow inwardly through holes 48. Growth of scar tissue takes place through these holes and through voids in the felt pad. Growth goes in both directions—from outside in and from the artery outward—the artery being in contact with the pad and the openings 48 permitting the continued growth of this tissue right on through the metal secions of the antipulse ring. Such tissue growth continues outwardly of the pulse ring until it establishes connection with other circumjacent body tissue. At the same time, adjacent outside tissue develops ingrowth through the openings 48 and felt pad 45 until it establishes connection with the compressed wall of the artery.

The compressed wall of the artery thereby becomes connected with circumjacent body tissue to receive blood supply and nourishment in addition to that received lengthwise through the artery wall itself from the normal uncompressed portion of the artery. This keeps the compressed portion of the artery in vital condition and prevents it from deteriorating as a result of being compressed. Thus, the provision for ingrowth of tissue permits a stronger clamping force than could otherwise be tolerated over a substantial area.

Artery clamping ring 13 has a plurality of arcuate sections 61, 62, 63 and 64 pivotally connected together by hinge pins 65 similar to the antipulse ring. The end sections 61 and 64 have ears 65 and 66 which are secured together by a screw 40 as in the antipulse ring. The dimensions of the artery clamping ring are such that when the ears are secured together, the inside cylindrical surface compresses the artery wall to approximately half its original thickness around the reduced section 15 of the sleeve 11. The inner surface of each section of the artery clamping ring is equipped with a multiplicity of sharp conical teeth 70 of sufficient length to pass substantially through the wall of the artery and almost contact the surface of sleeve 11 as shown. This ring is applied as close as possible to shoulder 18 so that it cannot slip to the left on sleeve 11 in FIGURE 1. The teeth 70 cannot pass the shoulder 18. Shoulder 18 is formed with a gradual slope without any abrupt offset. This ring is relatively narrow and does not compress a substantial length of the artery.

Tube pulse ring 14 is a smooth cylindrical band having an inwardly directed sloping flange 75 on its outer end which overhangs the end of sleeve 11 as shown. This flange applies axial pressure to crowd the wall of graft tube 10 up firmly against the rounded end 21 of the sleeve, causing the inside wall of the graft tube to bear against the end of the sleeve and prevent the formation of any crevice or pocket at this joint. The end of the graft tube is expanded slightly by the insertion of the sleeve causing the reenforcing wire 10 to slip circumferentially in the plastic or Silastic material and adjust itself to the larger diameter.

Tube pulse ring 14 is dimensioned to fit tightly over the graft tube and compress the wall of the tube to some extent, causing the plastic or Silastic material to flow into and completely fill the retention grooves 22. When this ring has been forced to the left as far as it will go, its left end overhangs the shoulder 19 and this overhanging portion is provided with two diametrically opposite holes 80 beyond the end of graft tube 10. A semicircular retainer wire 81 is then applied to the clamp ring, this wire having radially directed end portions 82 to enter the holes 80 and engage behind the shoulder 19, which is more abrupt than shoulder 18. This retainer locks the clamp ring to the sleeve 11 and the retention grooves 22 lock the graft tube to the sleeve.

The rings 12, 13 and 14 and the retaining means for the latter may vary in the details of construction for accomplishing the essential functions set forth. When a coupling or graft tube is interposed between two vessels of different size, the sleeve may be made as a reducer.

When the coupling C is made as a branch connector as previously mentioned, the sleeve 11 may be lengthened to include an integral branch tube or tubes between the clamping ring 13 and tube pulse ring 14. The branch tube may connect with another natural artery by means of an antipulse ring 12 and clamping ring 13 as shown at the left end of sleeve 11 or it may connect with another graft tube by means of a tube pulse ring 14 as shown at the right end of sleeve 11. Also, the shoulder 19 may be made to the same contour as shoulder 18 so that the right end of the sleeve may connect to a natural artery while the branch connects to either a graft tube or natural artery. The invention teaches a new and improved coupling with a natural artery and a new and improved coupling with a graft tube and these elements may be arranged in different configurations and combinations to effect different connections as desired.

Having now described my invention and in what manner the same may be used, what I claim as new and desire to protect by Letters Patent is:

1. An anastomotic coupling comprising a sleeve adapted to be inserted in the end of a natural tubular vessel in the body, a ring clamp adapted to clamp the vessel on said sleeve member, and a porous, compressible pad lining said clamp, said clamp having openings overlying said pad for the passage of body fluids to and through said pad to the vessel to promote the ingrowth of tissue in said pad for nourishment of the vessel.

2. In an arterial coupling device, a sleeve member, an antipulse ring arranged to clamp an artery on one end of said sleeve member, said ring including a porous, compressible pad lining, said ring and lining in assembled position on said artery and sleeve member having a portion overhanging the end of said sleeve member so that said pad presses the wall of the artery against the end surface of said sleeve member, and said ring having openings for the passage of body fluids to and through said pad to the artery to promote the ingrowth of tissue in said pad for nourishment of the clamped portion of the artery.

3. An arterial coupling device comprising a sleeve member, an antipulse ring arranged to clamp a blood vessel on one end of said sleeve member, said antipulse ring having a portion overhanging the end of said sleeve member to hold the inner wall of the blood vessel against the end surface of said sleeve member, an exterior shoulder on said sleeve member spaced from said end surface, a holding ring arranged to clamp a portion of the blood vessel behind said shoulder, and means for clamping another blood vessel on said sleeve in communication with said first vessel.

4. A coupling assembly comprising a sleeve member having one end adapted to be inserted into a natural body vessel and its opposite end inserted in a graft vessel, a clamp for clamping said natural vessel on said sleeve, a resilient pad in said clamp arranged to overhang said one end of said sleeve and hold said natural vessel against the end wall surface of the sleeve, a clamp clamping said graft vessel on said sleeve, and an inwardly directed flange on said last clamp overhanging said opposite end of the sleeve and holding said graft vessel against the end wall surface of the sleeve.

5. A coupling assembly comprising a sleeve having a center section with a smaller outside diameter than the opposite end sections, each end section having a shoulder at the transition to said center section, one end of said sleeve being adapted to be inserted into a natural body vessel and the opposite end being inserted in a graft vessel, a clamp for clamping said natural vessel on one end section of the sleeve, a resilient pad in said clamp arranged to overhang said one end of the sleeve and hold said natural vessel against the end wall surface of the sleeve, a clamp clamping said natural vessel on said smaller diameter center section of the sleeve behind the shoulder on said one end section, a clamp clamping said graft vessel on the opposite end section of said sleeve, an inwardly directed flange on said last clamp overhanging said opposite end of the sleeve and holding said graft vessel against the end wall surface of the sleeve, and a retainer on said last clamp engaging behind said shoulder on said opposite end section of the sleeve.

6. An anastomotic coupling comprising a sleeve having a center section of smaller outside diameter than the opposite end sections, a padded clamp for clamping a natural vessel on one of said end sections of the sleeve, a toothed clamp for clamping said natural vessel on said smaller diameter center section of the sleeve, and a clamp for clamping another vessel on the opposite end section of the sleeve.

7. An anastomotic coupling comprising a sleeve having a center section with a smaller outside diameter than the opposite end sections, each end section having a shoulder at the transition to said center section, a padded clamp for clamping a natural vessel on one of said end sections of the sleeve, one edge of said pad being adapted to overhang the end of the sleeve and hold the natural vessel against the end wall surface of the sleeve, a toothed clamp for clamping said natural vessel on said smaller diameter center section of the sleeve behind the shoulder on said one end section, a clamp for clamping a graft vessel on the opposite end section of the sleeve, an inwardly directed flange on said last clamp adapted to overhang said opposite end of the sleeve and hold the graft vessel against the end wall surface of the sleeve, and a retainer on said last sleeve engageable behind said shoulder on said opposite end section of the sleeve.

8. A clamp for an anastomotic coupling comprising a ring member arranged to open on one side to encircle a natural tubular vessel in the body, means to hold said ring member closed in circular configuration, and a porous, compressible pad lining said ring member, said ring member having openings therein for the passage of body fluids to and through said pad to the vessel to promote the ingrowth of tissue in said pad for nourishment of the vessel.

9. An anastomotic coupling comprising a sleeve having an end section and a reduced section adjacent said end section of smaller outside diameter than said end section, a padded clamp for clamping a natural body vessel on said end section, and a toothed clamp for clamping said vessel on said reduced section.

10. An anastomotic coupling comprising a sleeve having an end section adapted to receive a natural body vessel thereon, a ring clamp arranged to open on one side to encircle the vessel on said end section, means to hold said ring clamp closed to clamp said vessel, said clamp having a smooth inner surface overlying the vessel on said end section, said ring clamp having openings through the wall thereof for the passage of body fluids to the vessel to nourish the vessel, and means in said clamp arranged to overhang the end of said sleeve to hold the inner wall of the vessel against the end surface of the sleeve.

11. A coupling as defined in claim 10, said sleeve having a reduced section adjacent said end section of smaller outside diameter than said end section, and means to clamp a portion of said vessel on said reduced section.

12. A coupling as defined in claim 11, said last means comprising a toothed ring clamp.

References Cited

UNITED STATES PATENTS

| | | | |
|---|---|---|---|
| 1,382,840 | 6/1921 | Levodahl | 24—279 X |
| 2,183,551 | 12/1939 | Dold | 24—284 |
| 2,334,706 | 11/1943 | Ingalls | 24—279 X |
| 2,417,741 | 3/1947 | Dillon | 285—194 |
| 3,155,095 | 11/1964 | Brown | 128—334 |
| 3,221,746 | 12/1965 | Noble | 128—334 |
| 3,254,650 | 6/1966 | Collito | 128—334 |

FOREIGN PATENTS 446,873  7/1927  Germany.

OTHER REFERENCES

Taber et al., "Experimental and Clinical Utilization of a Prosthesis for Replacement of the Trachea," A.M.A. Archives of Surgery, October 1958, vol. 77, pp. 576–83.

DALTON L. TRULUCK, *Primary Examiner.*